United States Patent
Lee

(10) Patent No.: US 8,393,644 B2
(45) Date of Patent: Mar. 12, 2013

(54) SEAT BELT PRETENSIONER

(75) Inventor: John A. Lee, Rochester Hills, MI (US)

(73) Assignee: TRW Vehicle Safety Systems Inc., Washington, MI (US)

(*) Notice: Subject to any disclaimer, the term of this patent is extended or adjusted under 35 U.S.C. 154(b) by 0 days.

(21) Appl. No.: 13/370,359

(22) Filed: Feb. 10, 2012

(65) Prior Publication Data

US 2012/0205903 A1      Aug. 16, 2012

Related U.S. Application Data

(60) Provisional application No. 61/442,310, filed on Feb. 14, 2011.

(51) Int. Cl.
*B60R 22/36* (2006.01)
*B65H 75/48* (2006.01)
(52) U.S. Cl. ......... 280/806; 297/480; 242/374; 280/807
(58) Field of Classification Search ........... 280/806, 280/807; 242/374, 375.1, 375.3, 379.1, 394; 297/480
See application file for complete search history.

(56) References Cited

U.S. PATENT DOCUMENTS

| | | | | |
|---|---|---|---|---|
| 2,434,119 A * | 1/1948 | Nordmark | ............... | 242/382.6 |
| 4,061,291 A * | 12/1977 | Cunningham | ............ | 242/375.3 |
| 4,726,537 A * | 2/1988 | Escaravage | ............... | 242/375.3 |
| 4,729,524 A * | 3/1988 | Befort et al. | ............... | 242/382.4 |
| 4,925,123 A * | 5/1990 | Frei et al. | ................. | 242/374 |
| 5,222,682 A * | 6/1993 | Nishizawa et al. | ............. | 242/374 |
| 5,799,894 A * | 9/1998 | Kohlndorfer et al. | ...... | 242/382.4 |
| 6,019,305 A * | 2/2000 | Palliser | ..................... | 242/374 |
| 6,206,314 B1 * | 3/2001 | Shiotani et al. | ............. | 242/375.3 |
| 6,405,960 B2 * | 6/2002 | Yano | ......................... | 242/375.3 |
| 6,409,217 B1 * | 6/2002 | Denis | ........................... | 280/806 |
| 6,712,305 B2 * | 3/2004 | Palliser et al. | ............. | 242/379.1 |
| 6,969,089 B2 * | 11/2005 | Klingauf et al. | ............. | 280/805 |
| 7,887,095 B2 * | 2/2011 | Bieg et al. | .................... | 280/806 |
| 7,988,084 B2 * | 8/2011 | Lombarte et al. | ............ | 242/374 |
| 8,083,262 B2 * | 12/2011 | Hiramatsu et al. | ............ | 280/807 |
| 8,215,675 B2 * | 7/2012 | Sealy et al. | .................. | 280/806 |
| 8,220,735 B2 * | 7/2012 | Wang et al. | .................. | 242/374 |
| 2007/0241550 A1 | 10/2007 | Bieg et al. | | |
| 2009/0261567 A1 * | 10/2009 | Bieg et al. | ..................... | 280/806 |
| 2010/0244542 A1 * | 9/2010 | Sealy et al. | ................... | 297/480 |

* cited by examiner

*Primary Examiner* — Paul N Dickson
*Assistant Examiner* — Darlene P Condra
(74) *Attorney, Agent, or Firm* — Tarolli, Sundheim, Covell & Tummino LLP

(57) ABSTRACT

A seat belt pretensioner for a belt retractor includes a member that rotates relative to a frame of the belt retractor in response to a vehicle condition to rotate a spool of the belt retractor relative to the frame. A drive device rotates the member in response to the vehicle condition. The drive device applies a first torque to the member during a first stage of rotation of the member and the spool and applies a second torque greater than the first torque during a second stage of rotation of the member and the spool. A flexible drive member rotates the member relative to the frame. The flexible drive member extends around an axis of the member more than 360° after activation of the pretensioner.

22 Claims, 5 Drawing Sheets

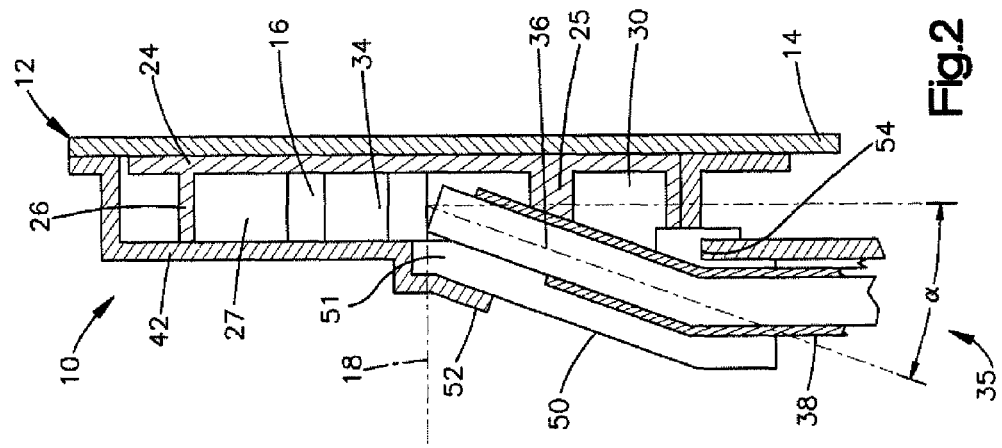
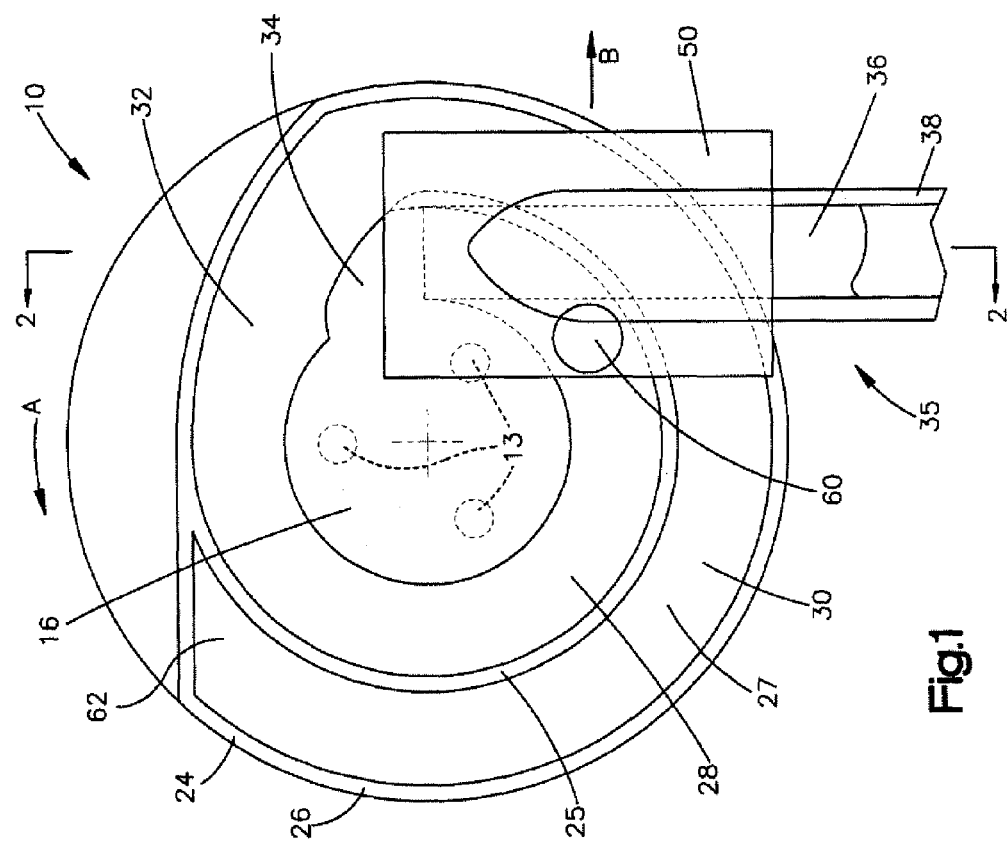

SEAT BELT PRETENSIONER

RELATED APPLICATIONS

This application claims the benefit of U.S. Provisional Patent Application Ser. No. 61/442,310, filed Feb. 14, 2011, the subject matter of which is incorporated herein by reference.

TECHNICAL FIELD

The present invention relates to a seat belt pretensioner mechanism that applies a force to tension a seat belt in the event of a vehicle crash condition.

BACKGROUND OF THE INVENTION

A typical vehicle seat belt system includes seat belt webbing extensible about a vehicle occupant for helping to restrain the occupant in the event of a vehicle crash condition. It is known to use a pretensioner to apply a force to the seat belt in the event of a vehicle crash condition. Typically, the pretensioner includes a pyrotechnic device that is actuated when a crash condition is sensed. A known pretensioner described in U.S. Patent Application Publication No. 2007/0241550 includes a flexible drive member.

SUMMARY OF THE INVENTION

The present invention relates to a seat belt pretensioner for a belt retractor including a member that rotates relative to a frame of the belt retractor in response to a vehicle condition to rotate a spool of the belt retractor relative to the frame. A drive device rotates the member in response to the vehicle condition. The drive device applies a first torque to the member during a first stage of rotation of the member and the spool and applies a second torque greater than the first torque during a second stage of rotation of the member and the spool.

In another aspect, a seat belt pretensioner includes a seat belt pretensioner for a belt retractor includes a member that rotates relative to a frame of the belt retractor in response to a sensed vehicle condition to rotate a spool of the belt retractor relative to the frame. A flexible drive member rotates the member relative to the frame. The flexible drive member extends around an axis of the member more than 360° after activation of the pretensioner.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 1 is a schematic view of a portion of an exemplary embodiment of a seat belt pretensioner showing the pretensioner in an unactuated condition;

FIG. 2 is a cross-sectional view of the seat belt pretensioner of FIG. 1 taken along the line 2-2 of FIG. 1;

DESCRIPTION OF AN EXEMPLARY EMBODIMENT

Figure 3:
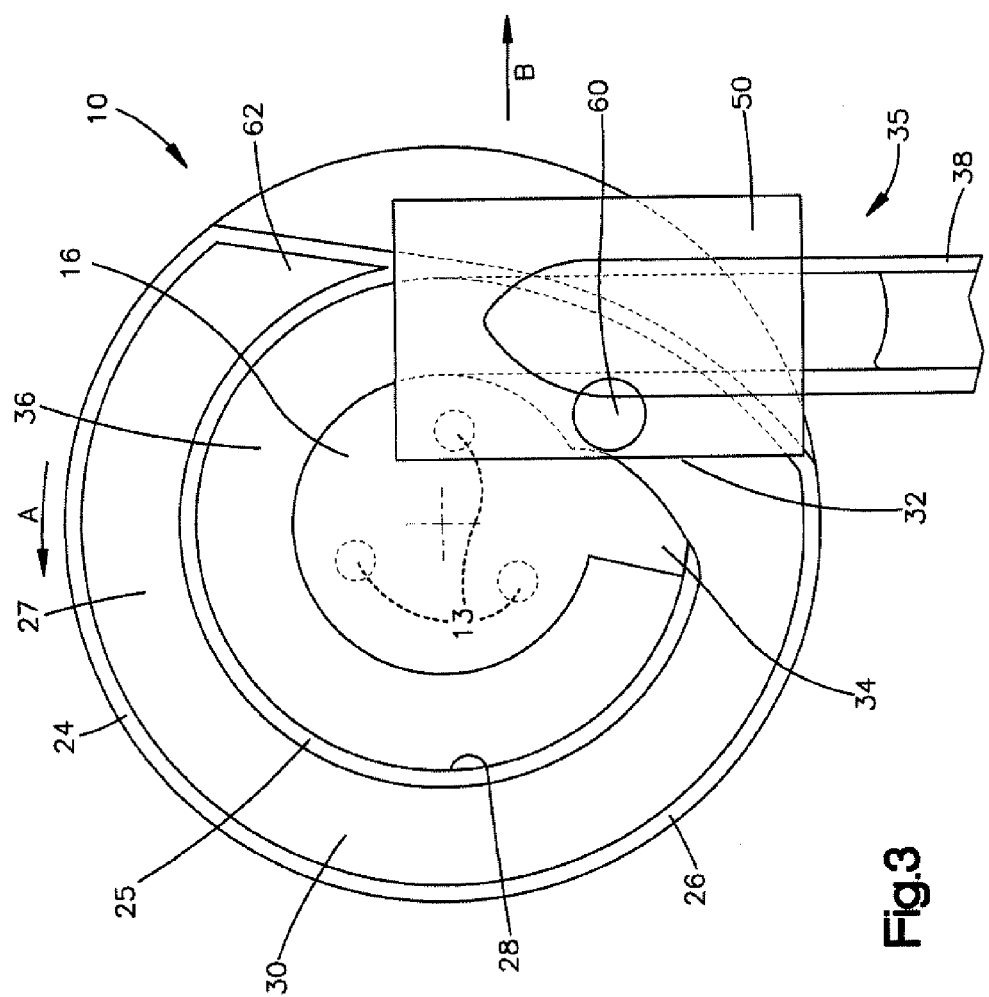
FIG. 3 is a schematic view of a portion of the seat belt pretensioner showing the pretensioner mechanism at the end of a first stage of operation.

The present invention relates to a pretensioner 10 to apply a force to a seat belt of a vehicle occupant safety system in the event of a vehicle crash condition. A vehicle occupant safety system for helping to protect an occupant of a vehicle seat during a vehicle crash condition includes the pretensioner 10. The vehicle occupant safety system may be a three-point continuous loop seat belt system for use in helping to restrain the occupant of the vehicle in the vehicle seat, as known in the art. Those skilled in the art will recognize that the vehicle occupant safety system may be a system other than a three-point continuous loop seat belt system.

The vehicle occupant safety system includes a length of seat belt webbing that is extensible about the occupant. One end of the length of seat belt webbing is anchored to the vehicle body and an opposite end of the seat belt webbing is attached to a seat belt retractor 12. A tongue assembly is attached to the seat belt webbing intermediate the ends of the seat belt webbing. The position of the tongue assembly along the seat belt webbing and relative to the ends of the seat belt webbing is adjustable. The seat belt webbing also extends through a D-ring mounted to the vehicle.

When the occupant safety system is not in use, the seat belt webbing is wound onto the retractor. To engage the occupant safety system, the tongue assembly is manually grasped and is pulled across the lap and torso of the occupant seated in the seat. As the tongue assembly is pulled, the seat belt webbing is unwound from the retractor. The tongue assembly is latched in a buckle connected to the vehicle body on a side of the seat.

When the seat belt system is latched or buckled, the length of seat belt webbing is divided into a torso portion and a lap portion. The torso portion extends from the D-ring to the tongue assembly across the torso of the occupant. The lap portion extends from the tongue assembly and is anchored to the vehicle body on a side of the seat opposite from the buckle. The lap portion extends across the lap of the occupant.

During the manual pulling of the tongue assembly toward the buckle, the tongue assembly moves along the seat belt webbing. The movement of the tongue assembly relative to the seat belt webbing assures that the lap portion of the seat belt webbing fits snugly across the lap of the occupant.

A seat belt pretensioner 10 constructed in accordance with an exemplary embodiment of the invention is illustrated in FIGS. 1-6. The seat belt pretensioner 10 applies a force to the seat belt in the event of a vehicle crash condition. The seat belt pretensioner 10 is connected with a frame or housing 14 (FIG. 2) of the belt retractor 12. A hub member 16 (FIG. 1) is connected to a spool of the belt retractor 12 by a clutch mechanism 13. The clutch mechanism 13 permits relative rotation between the hub member 16 and the spool about an axis 18 of the hub and spool during normal operation of the retractor 12. The clutch mechanism 13 causes the hub 16 and spool to rotate together about the axis 18 relative to the housing 14 of the retractor 12 when the belt pretensioner 10 is activated in response to a sensed vehicle condition, such as vehicle deceleration or tilt. The clutch mechanism 13 may cause the hub 16 and the spool to rotate together in any desired manner.

A first guide 24 is connected with the hub member 16. The first guide 24 rotates with the hub member 16 and may be formed as one piece with the hub. The first guide 24 has a first radially inner wall portion 25 and a second radially outer wall portion 26. The wall portions 25 and 26 define a passage or trough 27.

The passage or trough 27 has a first generally circular portion 28 adjacent the hub 16, a second generally circular portion 30 radially outwardly of the first circular portion 28 and a transition portion 32 interconnecting the first and second portions. Accordingly, the passage or trough 27 has a generally helical configuration. The first portion 28 of the passage 27 is defined by the hub 16 and the first radially inner wall portion 25. The second portion 30 of the passage 27 is defined by the first and second wall portions 25 and 26.

The hub member 16 has an extension 34 extending radially outwardly into the first portion 28 of the passage 27. A drive device 35 includes a flexible driving member 36, here in the form of an elastically deformable or flexible solid (e.g. nitrile butadiene rubber or another elastomer or thermoplastic). The driving member 36 has an end engaging the extension 34. The driving member 36 extends axially away from the housing 12 of the retractor, as shown in FIG. 2, and tangentially to the hub 16, as shown in FIG. 1.

The drive device 35 includes a tubular member 38 through which the driving member 36 extends. A gas generator (not shown) is connected with an end of the tubular member 38. The gas generator produces pressurized gas in the tubular member 38 to move driving member 36 relative to the tubular member. The gas generator receives a signal from a sensor (not shown) to activate the gas generator in response to the sensed vehicle condition, such as vehicle deceleration or tilt indicating a vehicle crash condition.

When the gas generator is activated, the clutch mechanism 13 causes the hub member 16 and spool to rotate together. The driving member 36 moves along the tubular member 38. Upon activation of the pretensioner 10, the driving member 36 is forced against the extension 34 to rotate the hub member 16, the spool of the retractor 12, and the first guide 24 relative to the housing 14 of the retractor in a belt retraction direction, indicated by arrow A in FIG. 1, to retract the seat belt onto the spool. The walls 25 of the first guide 24 may include roughened surfaces to help prevent sliding of the drive member 36 relative of the first guide 24 during operation of the pretensioner 10. A cover 42 (FIG. 2) is connected to the housing 14 of the retractor 12. The cover 42 helps retain the driving member 36 in the passage or trough 27 of the guide 24 during operation of the pretensioner 10.

A second guide 50 is movably connected to the cover 42. The second guide 50 may be connected to cover 42 so that the entire second guide may move linearly to the right relative to the cover in the direction indicated by arrow B in FIG. 1. It is also contemplated that the second guide 50 may be pivotally connected to the cover 42 by a pivot pin located near the bottom left corner of the second guide 50, as viewed in FIG. 1.

The second guide 50 is connected with an end of the tubular member 38 opposite the gas generator. The driving member 36 extends through the tubular member 38 and engages the second guide 50. The second guide 50 guides the driving member 36 into the passage or trough 27 in the first guide 24. The driving member 36 extends at an angle α of between 10° and 30°, and preferably about 20°, relative to a line extending generally perpendicular to the axis 18, as seen in FIG. 2. It is contemplated that the driving member 36 may extend at any desired angle relative to the line extending perpendicular to the axis 18 and parallel to a bottom surface of the first guide 24. The second guide 50 moves in the direction indicated by arrow B radially outwardly relative to the cover 42 to guide movement of the driving member 36 into the passage or trough 27 during rotation of the first guide 24 relative to the cover 42.

The second guide 50 may have a portion 51 extending under a lip 52 extending from the cover 42. The second guide 50 may also include a slot 54 into which a portion of the cover 42 extends. The lip 52 and the slot 54 help guide movement of the second guide 50 relative to the cover 42 in the direction B. The second guide 50 slides along the lip 52 and the slot 54 slides along the cover 42 during rotation of the first guide 24 relative to the cover 42.

A guide member or pin 60 extends from the second guide 50 into the passage 27 in the first guide 24. As the first guide 24 rotates relative to the cover 42, the walls 25, 26 defining the passage or trough 27 and the hub member 16 engage the guide pin 60 to move the second guide in the direction B so that the second guide directs the driving member 36 into the empty portion of the passage. The guide pin 60 may cause the second guide 50 to pivot relative to the cover 52 if the second guide 50 is pivotally connected to the cover 42.

Upon the occurrence of the sensed vehicle condition indicating a vehicle crash condition, the gas generator is activated and the clutch mechanism 13 is engaged to cause the spool of the retractor 12 to rotate with the hub member 16. The clutch mechanism 13 may be engaged in response to the sensed vehicle condition or in response to actuation of the gas generator. Upon activation of the gas generator, the driving member 36 is forced toward the extension 34 on the hub member 16 causing the hub member, the first guide 24, and the spool to rotate together about the axis 18 relative to the housing 14 of the retractor 12 and the cover 42 in the belt retraction direction A. As the first guide 24 rotates, the second guide 50 directs the driving member 36 into the passage or trough 27 in the first guide 24.

Figure 4:
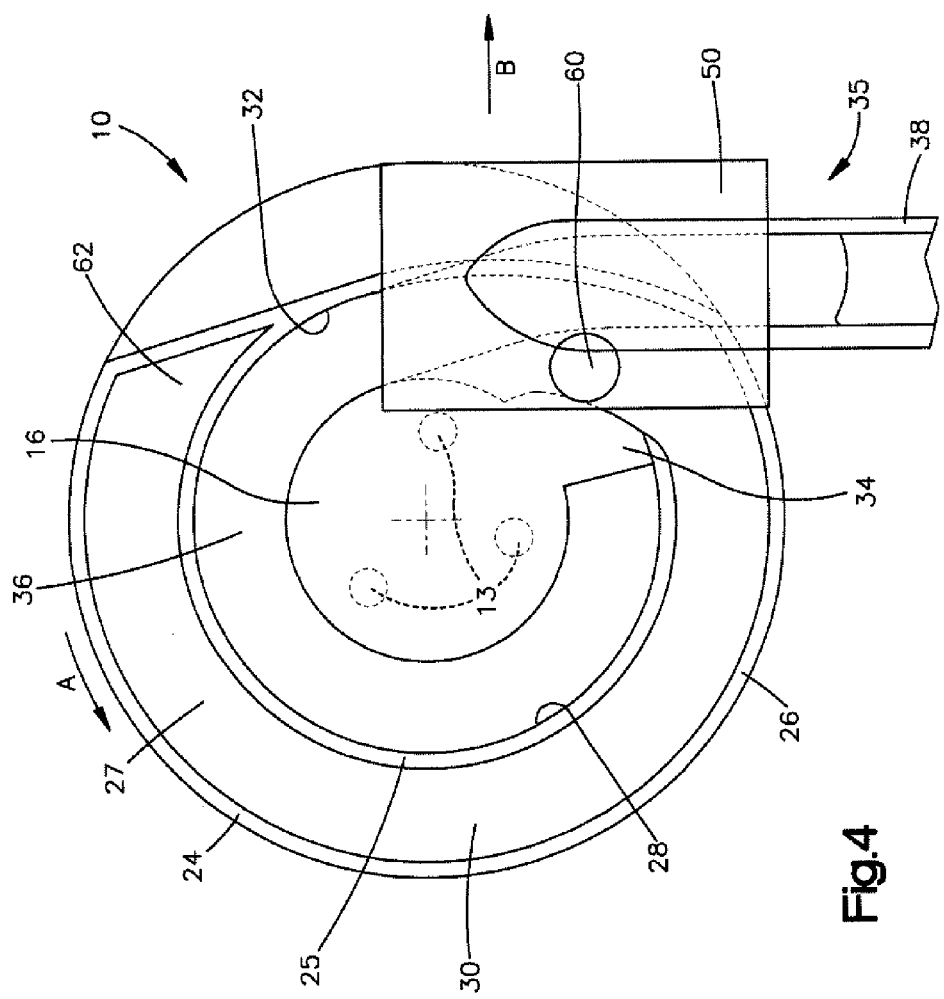
FIG. 4 is a schematic view of a portion of the seat belt pretensioner showing the pretensioner mechanism transitioning from a first stage of operation to a second stage of operation.

During a first stage of rotation of the hub member 16 and the spool relative to the frame 14, the second guide 50 directs the driving member 36 into the first portion 28 of the passage 27, as seen in FIG. 3. After the first portion 28 of the passage 27 is filled with the driving member 36, the guide pin 60 of the second guide 50 engages the extension 34 and moves from the first portion 28 of the passage 27 to the transition portion 32 of the passage, as seen in FIG. 4. The second guide 50 moves in the direction B and directs the driving member 36 into the transition portion 32 of the passage 27.

Figure 5:
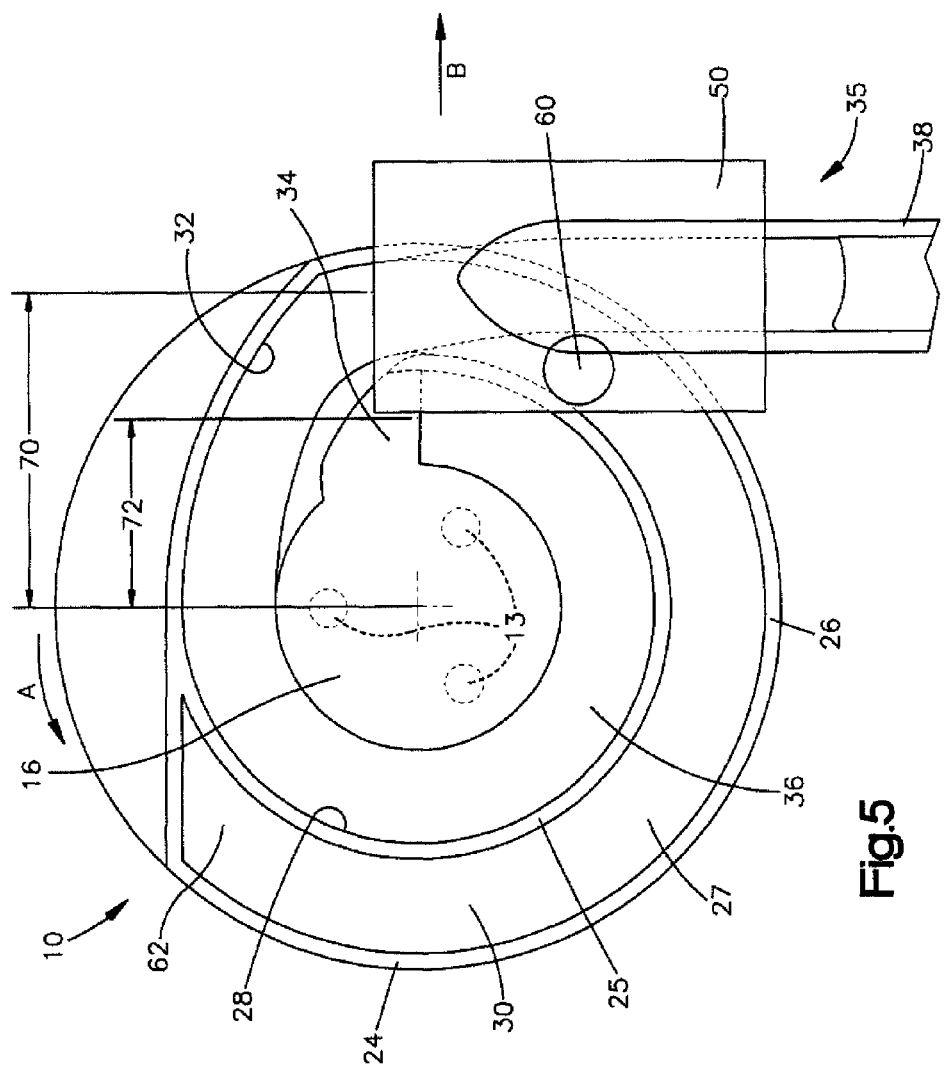
FIG. 5 is a schematic view of a portion of the seat belt pretensioner showing the pretensioner mechanism at the beginning of the second stage of operation.
Figure 6:
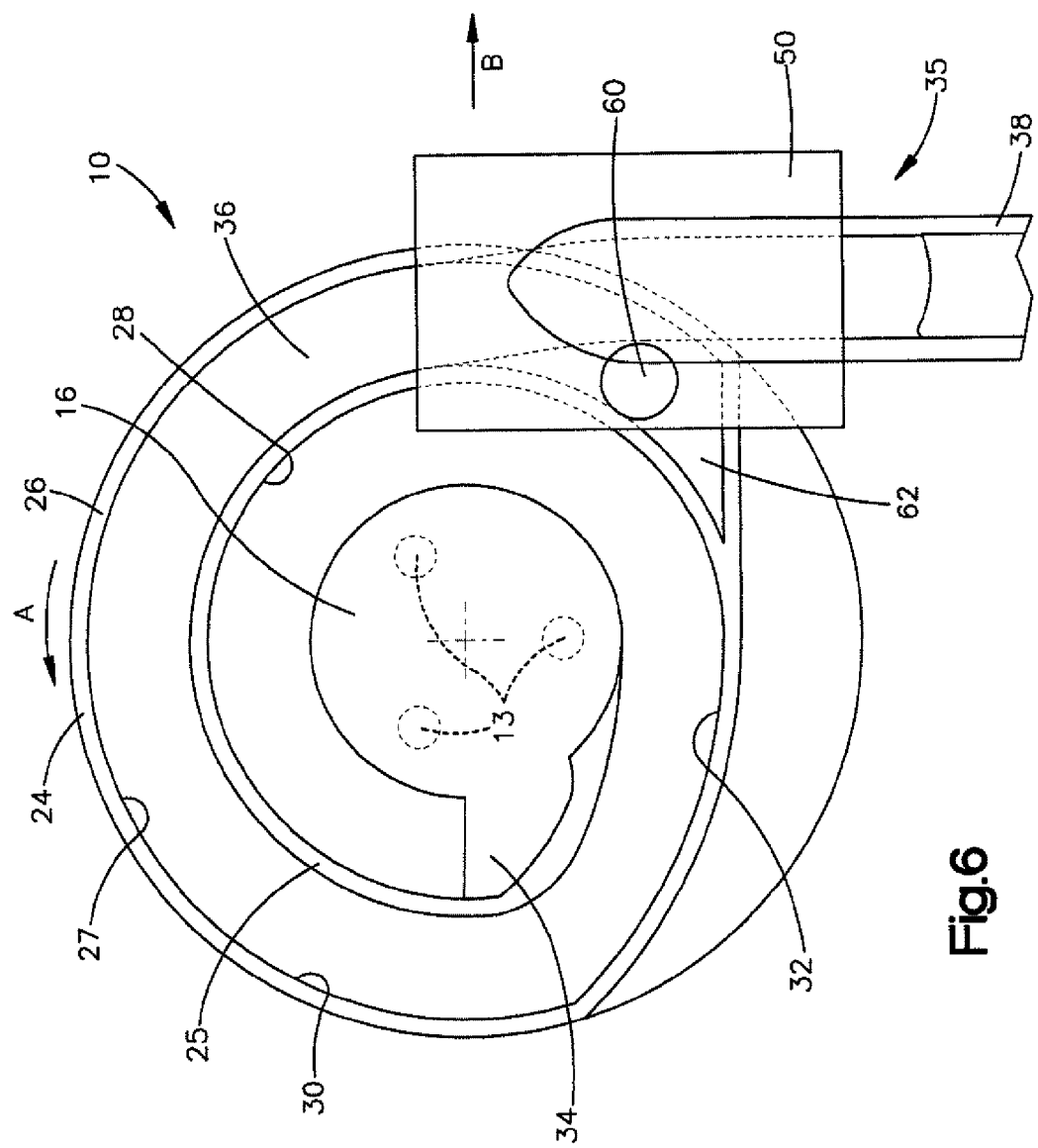
FIG. 6 is a schematic view of a portion of the seat belt pretensioner showing the pretensioner mechanism at the end of the second stage of operation.

The guide pin 60 of the second guide 50 moves from the transition portion 32 into the second portion 30 of the passage 27 as the first guide 24 and the spool continue to rotate. The second guide 50 moves farther in the direction B and directs the driving member 36 into the second portion 30 of the passage 27 during a second stage of rotation of the hub member 16 and the spool, as seen in FIG. 5. The second stage of rotation occurs after approximately 360° of rotation of the hub member 16 relative to the frame 14. The guide 24 and the spool stop rotating when the pin 60 reaches a closed end 62 of the passage 27, as seen in FIG. 6.

The second portion 30 of the passage 27 has a radius 70 (FIG. 5) and, therefore, moment arm, that is larger than a radius 72 and moment arm of the first portion 28 of the passage. Accordingly, the driving member 36 applies a first torque to the hub member 16 and the spool during the first stage of rotation of the hub member and spool relative to the frame 14. The driving member 36 applies a second torque greater than the first torque during the second stage of rotation of the hub member 16 and the spool. The passage 27 also permits the hub member 16 and, therefore, the spool, to rotate through more than 360° and approximately 540°. The flexible drive member 36 extends around the axis 18 of the hub 16 more than 360° after activation of the pretensioner 10.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. A seat belt pretensioner for a belt retractor comprising:
a member that rotates relative to a frame of the belt retractor in response to a vehicle condition to rotate a spool of the belt retractor relative to the frame;
a drive device for rotating the member in response to the vehicle condition, the drive device applying a first torque to the member during a first stage of rotation of the member and the spool and applying a second torque greater than the first torque during a second stage of rotation of the member and the spool.

2. A seat belt pretensioner as set forth in claim 1 wherein the drive device applies the first torque to the member upon activation of the seat belt pretensioner and applies the second torque to the member after the first stage of rotation.

3. A seat belt pretensioner as set forth in claim 2 wherein the drive applies the second torque to the member after approximately 360° of rotation of the member relative to the frame.

4. A seat belt pretensioner as set forth in claim 1 wherein the drive device includes a flexible drive member engaging the member and a device for moving the flexible drive member relative to the frame, the flexible drive member extending around an axis of the member more than 360° after activation of the pretensioner.

5. A seat belt pretensioner as set forth in claim 4 further including a first guide engaging the flexible drive member to cause the flexible drive member to extend around the axis of the member.

6. A seat belt pretensioner as set forth in claim 5 wherein the first guide rotates with the member relative to the frame.

7. A seat belt pretensioner as set forth in claim 5 wherein a second guide guides movement of the flexible drive member into the first guide.

8. A seat belt pretensioner as set forth in claim 7 wherein the second guide moves relative to the first guide and the frame to guide the flexible drive member into first and second portions of the first guide.

9. A seat belt pretensioner as set forth in claim 8 wherein a guide member on the second guide engages the first guide to move the second guide relative to the first guide and the frame.

10. A seat belt pretensioner as set forth in claim 5 wherein the first guide has a first portion into which the flexible drive member extends during the first stage of rotation and a second portion into which the flexible drive member extends during the second stage of rotation.

11. A seat belt pretensioner as set forth in claim 10 wherein the first guide includes a generally helical passage for receiving the flexible drive member.

12. A seat belt pretensioner as set forth in claim 4 wherein a portion of the flexible drive member extends at an angle of between 10° and 30° relative to a line extending perpendicular to an axis about which the member rotates.

13. A seat belt pretensioner for a belt retractor comprising:
a member that rotates relative to a frame of the belt retractor in response to a sensed vehicle condition to rotate a spool of the belt retractor relative to the frame;
a flexible drive member engaging the member to rotate the member relative to the frame, the flexible drive member extending around an axis of the member more than 360° after activation of the pretensioner.

14. A seat belt pretensioner as set forth in claim 13 wherein the flexible drive member applies a first torque to the member upon activation of the seat belt pretensioner during a first stage of rotation of the member and applies a second torque greater than the first torque during a second stage of rotation of the member after the first stage of rotation.

15. A seat belt pretensioner as set forth in claim 14 wherein the drive applies the second torque to the member after approximately 360° of rotation of the member relative to the frame.

16. A seat belt pretensioner as set forth in claim 13 further including a first guide engaging the flexible drive member to cause the flexible drive member to extend around the axis of the member.

17. A seat belt pretensioner as set forth in claim 16 wherein the first guide rotates with the member relative to the frame.

18. A seat belt pretensioner as set forth in claim 16 wherein a second guide guides movement of the flexible drive member into the first guide.

19. A seat belt pretensioner as set forth in claim 18 wherein the second guide moves relative to the first guide and the frame to guide the flexible member into first and second portions of the first guide.

20. A seat belt pretensioner as set forth in claim 19 wherein a guide member on the second guide engages the first guide to move the second guide relative to the first guide and the frame.

21. A seat belt pretensioner as set forth in claim 16 wherein the first guide includes a generally helical passage for receiving the flexible drive member.

22. A seat belt pretensioner as set forth in claim 13 wherein a portion of the flexible member extends at an angle of between 10° and 30° relative to a line extending perpendicular to an axis about which the member rotates.

* * * * *